US009065600B2

(12) United States Patent
Miao et al.

(10) Patent No.: US 9,065,600 B2
(45) Date of Patent: Jun. 23, 2015

(54) AGGREGATION FOR A NEW CARRIER TYPE (75) Inventors: Honglei Miao, Espoo (FI); Mika P. Rinne, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/420,085

(22) Filed: Mar. 14, 2012

(65) Prior Publication Data

US 2013/0242880 A1    Sep. 19, 2013

(51) Int. Cl.
*H04L 5/00*         (2006.01)
*H04W 72/12*        (2009.01)
*H04W 72/04*        (2009.01)
*H04W 16/10*        (2009.01)
*H04W 16/12*        (2009.01)
*H04W 72/08*        (2009.01)
*H04W 72/00*        (2009.01)
*H04W 8/26*         (2009.01)
*H04W 28/16*        (2009.01)
*H04W 84/04*        (2009.01)

(52) U.S. Cl.
CPC .............. *H04L 5/001* (2013.01); *H04L 5/0044* (2013.01); *H04L 5/0053* (2013.01); *H04W 72/1289* (2013.01)

(58) Field of Classification Search
CPC ............................. H04W 72/04; H04L 5/001
USPC ................. 370/241, 312, 322–326, 328, 329, 370/341–345, 348, 350; 375/260; 455/450, 455/425, 426.1, 426.2
See application file for complete search history.

(56) References Cited

U.S. PATENT DOCUMENTS

| 7,852,813 | B2 * | 12/2010 | Suh et al. ...................... 370/335 |
| 2007/0060091 | A1 * | 3/2007 | Kim et al. ...................... 455/266 |
| 2010/0034303 | A1 | 2/2010 | Damnjanovic et al. ........ 375/260 |
| 2010/0173667 | A1 | 7/2010 | Hui et al. ................... 455/552.1 |
| 2010/0254268 | A1 | 10/2010 | Kim et al. ..................... 370/241 |
| 2010/0291934 | A1 * | 11/2010 | Lopes ........................... 455/446 |
| 2011/0044391 | A1 | 2/2011 | Ji et al. ......................... 375/260 |
| 2011/0081913 | A1 * | 4/2011 | Lee et al. ...................... 455/450 |
| 2011/0085506 | A1 | 4/2011 | Lee et al. ...................... 370/329 |
| 2011/0110296 | A1 | 5/2011 | Malladi et al. ................ 370/328 |
| 2011/0222489 | A1 * | 9/2011 | Awad ............................ 370/329 |
| 2011/0249633 | A1 * | 10/2011 | Hong et al. ................... 370/329 |

(Continued)

FOREIGN PATENT DOCUMENTS

| EP | 2306782 A1 | 4/2011 |
| WO | WO-2004102839 A1 | 11/2004 |
| WO | WO-2011019232 A2 | 2/2011 |

OTHER PUBLICATIONS

"On New Carrier Types: Carrier Segments and backward compatible support", Intel Corporation, 3GPP TSG RAN WG1 Meeting #67, R1-113953, Nov. 2011, 4 pgs.

*Primary Examiner* — Un C Cho
*Assistant Examiner* — Peian Lou
(74) *Attorney, Agent, or Firm* — Harrington & Smith (57) ABSTRACT

The specification and drawings present a new method, apparatus and software related product (e.g., a computer readable memory) for aggregation of a new carrier type by configuring PCC (for PCell) and SCC (for SCell) bandwidths to be overlapped or at least partially overlapped and by control signaling, e.g., using PDCCH and/or E-PDCCH, for scheduling of data resources on SCC thus simultaneously serving legacy and non-legacy UEs, e.g., in LTE-A systems.

19 Claims, 9 Drawing Sheets

(56) References Cited

U.S. PATENT DOCUMENTS

| | | | |
|---|---|---|---|
| 2011/0274066 A1 | 11/2011 | Tee et al. | 370/329 |
| 2011/0280223 A1* | 11/2011 | Maeda et al. | 370/335 |
| 2011/0292891 A1 | 12/2011 | Hsieh et al. | 370/329 |
| 2012/0106465 A1 | 5/2012 | Haghihhat et al. | 370/329 |
| 2013/0114517 A1* | 5/2013 | Blankenship et al. | 370/329 |
| 2013/0163447 A1* | 6/2013 | Koskela et al. | 370/252 |
| 2013/0208645 A1* | 8/2013 | Feng et al. | 370/312 |
| 2014/0098785 A1* | 4/2014 | Frenne et al. | 370/330 |

\* cited by examiner

Localized PDSCH only present in SCell

Figure 3a

Two localized PDSCHs in both PCell and SCell

Figure 3b

One localized PDSCH served by SCell with partial resources in the range of PCell bandwidth

Figure 3c

One distributed PDSCH served by SCell with partial resources in the range of PCell bandwidth

Figure 3d

Localized PDSCH only present in SCell

Figure 4a

Two localized PDSCHs in both PCell and SCell

Figure 4b

One localized PDSCH served by SCell with partial resources in the range of PCell bandwidth

Figure 4c

One distributed PDSCH served by SCell with partial resources in the range of PCell bandwidth

Figure 4d

Localized PDSCH only present in SCell

Figure 5a

Two localized PDSCHs in both PCell and SCell

Figure 5b

One localized PDSCH served by SCell with partial resources in the range of PCell bandwidth

Figure 5c

One distributed PDSCH served by SCell with partial resources in the range of PCell bandwidth

AGGREGATION FOR A NEW CARRIER TYPE

TECHNICAL FIELD

The exemplary and non-limiting embodiments of this invention relate generally to wireless communications and more specifically to aggregation of a new carrier type in LTE-A systems.

BACKGROUND ART

The following abbreviations that may be found in the specification and/or the drawing figures are defined as follows:
3GPP 3$^{rd}$ generation partnership project
CA carrier aggregation
CoMP coordinated multi-point
C-SON centralized SON
CRS cell-specific reference signal
CSI channel state information
CSI-RS channel state information reference signal
DCI downlink control information
DL downlink
DMRS demodulation reference signal or UE-specific reference signal
eNB, eNodeB evolved node B/base station in an E-UTRAN system
E-PDCCH enhanced physical downlink control channel
E-PCFICH enhanced physical control format indicator channel
E-UTRAN evolved UTRAN (LTE)
FDD frequency division duplexed
HetNet heterogeneous network
ICIC inter-cell interference coordination
LTE long term evolution
LTE-A long term evolution advanced
MAC medium access control
NMS Network Management System
O&M operation and maintenance
PBCH physical broadcast channel
PCC primary component carrier
PCell primary cell
PDCCH physical downlink control channel
PDSCH physical downlink shared channel
PDU protocol data unit
PRB physical resource block
PSS primary synchronization signal
QoC quality of service
RAN radio access network
RF radio frequency
RS reference signal
RRC radio resource control
RRH remote radio head
SCell secondary cell
SCC secondary component carrier
SI system information
SON self optimizing network
SS search space
SSS Secondary synchronization signal
TDD time division duplexed
TTI transmission time interval, e.g. a subframe
UE user equipment
UL uplink
UTRAN universal terrestrial radio access network
X2 interface between eNBs
X2 AP X2 application protocol The LTE carrier aggregation enhancement work item was approved in RAN Meeting#51 and further updated in RAN Meeting#52. In RAN1#66bis, the following working assumption has been agreed for support of new carrier types: introduce at least one new carrier type in 3GPP Release-11 (bandwidth agnostic from a RAN1 point of view), with at least reduced or eliminated legacy control signaling and/or CRS.

SUMMARY

According to a first aspect of the invention, a method comprises:
configuring by at least one network element a first bandwidth for a primary component carrier and a second bandwidth for a secondary component carrier, the first and second bandwidths being at least partially overlapped and the second bandwidth being larger than the first bandwidth; and selecting between at least one of a first signaling channel within the first bandwidth and a second signaling channel within the second bandwidth for scheduling data resources on the secondary component carrier.

According to a second aspect of the invention, a method comprises: receiving by a user equipment from at least one network element information comprising data resources on a secondary component carrier using signaling on at least one of first and second signaling channels, wherein a primary component carrier has a first bandwidth and the secondary component carrier has a second bandwidth, the first and second bandwidths being at least partially overlapped and the second bandwidth being larger than the first bandwidth; synchronizing communication by the user equipment with one of: a primary cell on the primary component carrier and a secondary cell on the secondary component carrier to use the established synchronization with one of the primary and secondary cells for communicating with both the primary and the secondary cells; and adopting by the user equipment a signaling format for communication using the data resources on the secondary component carrier.

According to a third aspect of the invention, an apparatus comprises: at least one processor and a memory storing a set of computer instructions, in which the processor and the memory storing the computer instructions are configured to cause the apparatus to: configure a first bandwidth for a primary component carrier and a second bandwidth for a secondary component carrier, the first and second bandwidths being at least partially overlapped and the second bandwidth being larger than the first bandwidth; and select between at least one of a first signaling channel within the first bandwidth and a second signaling channel within the second bandwidth for scheduling data resources on the secondary component carrier.

According to a fourth aspect of the invention, an apparatus comprises: at least one processor and a memory storing a set of computer instructions, in which the processor and the memory storing the computer instructions are configured to cause the apparatus to: receive from at least one network element information comprising data resources on a secondary component carrier using signaling on at least one of first and second signaling channels, wherein a primary component carrier has a first bandwidth and the secondary component carrier has a second bandwidth, the first and second bandwidths being at least partially overlapped and the second bandwidth being larger than the first bandwidth; synchronize communication by the user equipment with one of: a primary cell on the primary component carrier and a secondary cell on the secondary component carrier to use the established synchronization with one of the primary and secondary cells for communicating with both the primary and the secondary cells; and adopt by the user equipment a signaling format for communication using the data resources on the secondary component carrier.

BRIEF DESCRIPTION OF THE DRAWINGS

For a better understanding of the nature and objects of the present invention, reference is made to the following detailed description taken in conjunction with the following drawings, in which.

DETAILED DESCRIPTION

A new method, apparatus, and software related product (e.g., a computer readable memory) are presented for aggregation of a new carrier type by configuring Primary Component Carrier PCC (for Primary cell, PCell) and Secondary Component Carrier SCC (for Secondary cell, SCell) bandwidths to be overlapped or at least partially overlapped and by control signaling, e.g., using Physical Downlink Control Channel (PDCCH) and/or Enhanced-Physical Downlink Control Channel (E-PDCCH), for scheduling of data resources on SCC thus simultaneously serving legacy and non-legacy User Equipment (UE)s, e.g., in LTE-A systems.

By way of introduction, a new carrier type can enable additional transmission bandwidth beyond the set of 3GPP Release-8/9/10 bandwidth values defined by RAN4, i.e., {6, 15, 25, 50, 75, 100} physical resource blocks (PRB). The new carrier type, in 3GPP Release-11, is expected to support the use of new transmission bandwidth in a backward compatible way, which allows the use of any of the original 3GPP Release-8/9/10 bandwidth by legacy UE while at the same time employing the aggregated additional bandwidth for 3GPP Release-11 compliant UEs. The resources on the additional bandwidth may be called carrier segments. The set of resources on the full bandwidth accessed in a non-legacy manner may be called a new carrier type. One of the open questions regarding the additional carrier segments is the control signaling design, i.e., how to signal the use of additional PRB resources.

The enhanced PDCCH (E-PDCCH) is a work item for 3GPP Release-11 with an objective to standardize an enhanced control channel to increase the control channel capacity and control channel efficiency. The E-PDCCH would potentially benefit from the frequency selective scheduling gains, beamforming and/or diversity gains, coverage gains due to a longer span of transmission time and enable frequency domain interference control (ICIC) for the control channel. Some of these gains are not equally available by the legacy PDCCH.

Currently, there is no agreed solution to the control signaling for carrier segments, nor for a new carrier type. However, some possible solutions have been discussed in the 3GPP meetings. For example, a fixed pairing mechanism between the aggregated resources and the edge part of the main carrier was presented in R1-113953, "On new carrier types: carrier segments and backward compatible support", Intel corporation, 3GPP TSG RAN Meeting #67, San Francisco, USA, Nov. 14-18, 2011, wherein the PDCCH is used for the resource allocation. When the carrier segments is configured for the 3GPP Release-11 UE, and the resources within the edge of the main carrier are allocated via PDCCH, then the corresponding resources in the carrier segments shall be allocated to the UE as well. Similarly, some special frequency indexing treatment in the physical layer was also suggested in some documents. However, all these proposals require a special dedicated treatment of the carrier segments in the physical layer.

According to an embodiment of the invention, E-PDCCH based control signaling methods can apply for the 3GPP Release-11 compliant UEs served on the new carrier type, while legacy signaling is done for legacy UEs on legacy bandwidth on the PDCCH. For the purpose of the present invention, the term "legacy" refers to the 3GPP standard release-8/9/10 and the term "non-legacy" refers to new methods in 3GPP standard Release-11 and beyond. However, it is understood that the means invented and described herein may be gradually standardized and taken into use between any 3GPP standard releases after the legacy 3GPP standard Release-10, not necessarily between the Release-10 and Release-11.

The new carrier type may have a secondary carrier with a bandwidth (or a second bandwidth) which overlaps or at least partially overlaps with a legacy bandwidth (or a first bandwidth) of a legacy carrier (or a primary carrier). The primary carrier resources can be used in a backwards compatible manner for the legacy UEs, whereas the new secondary carrier resources can be used in a non-backwards compatible manner for the 3GPP Release-11 complaint UEs, even if these resources overlap or at least partially overlap. This solution also efficiently mitigates the need to handle carrier segments in a special dedicated way.

Figure 1A:
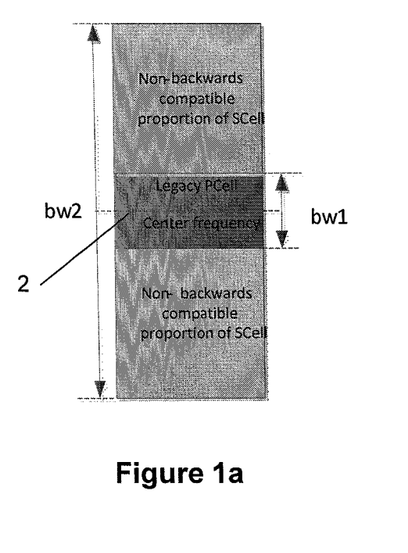
FIGS. 1a-1c are different scenarios for carrier allocation using co-centric frequency allocation (FIG. 1a), edge-aligned frequency allocation (FIG. 1b) and arbitrary overlapping frequency allocation (FIG. 1c), according to exemplary embodiments of the invention.
Figure 1B:
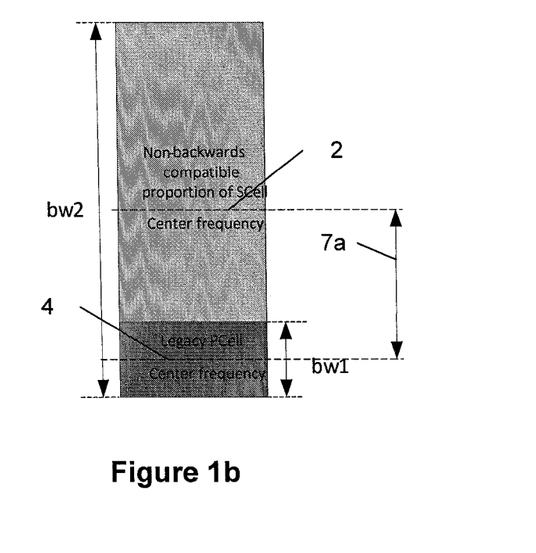
Figure 1C:
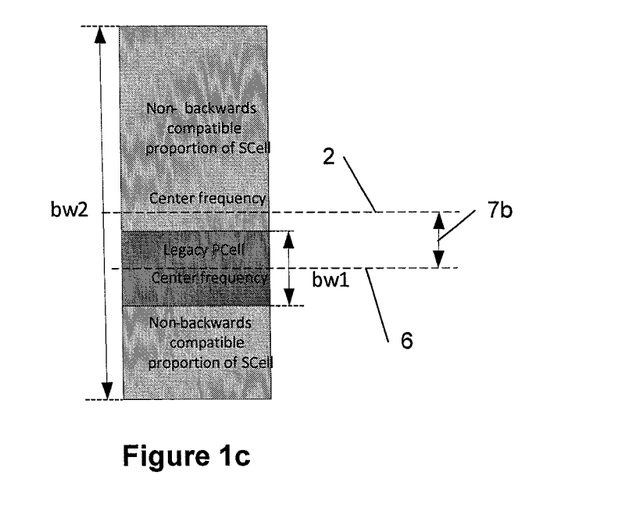

Moreover, a primary cell (PCell) having the first (legacy) bandwidth (bw1) and a secondary cell (SCell) having the second bandwidth (bw2) can share the same PRBs over the first legacy bandwidth bw1 and extended PRBs in the second bandwidth bw2 usable for the SCell. The bandwidth bw2 of the SCell may be selected from a set of legacy bandwidths but treated in a special way, or bw2 may be a non-backwards compatible bandwidth selection. FIGS. 1a-1c illustrate different scenarios of carrier allocation for carrier aggregation using co-centric frequency allocation as shown in FIG. 1a, edge-aligned frequency allocation as shown in FIG. 1b and arbitrary overlapping frequency allocation in FIG. 1c, according to exemplary embodiments.

In all 3 cases shown in FIGS. 1a-1c bandwidths bw1 and bw2 are overlapped and bw2>bw1 (bw1 is inside of bw2). In FIG. 1a both bandwidths bw1 and bw2 of the primary and secondary cells have co-centric (center) carrier frequency 2 (i.e., their center frequencies are the same). In FIG. 1b the bandwidth bw2 of the secondary cell has the same center frequency 2 as in FIG. 1*a*, but the bandwidth bw1 of the primary cell has a different center frequency 4, offset by a frequency offset 7*a* so that edges of the bw1 and bw2 are aligned on a low frequency edge. A similar example could be given, where the edges of the bw1 and bw2 are aligned on a high frequency edge respectively. In FIG. 1*c* the bandwidth bw2 of the secondary cell has the same center frequency 2 as in FIG. 1*a*, but the bandwidth bw1 of the primary cell has an arbitrary center frequency 6, which is different from the center frequency 2 and 4 and offset by a frequency offset 7*b* relative to center frequency 2.

It is noted, that the overlapping portions of the bandwidths bw1 and bw2 have double indexing for these PRBs to allow using the same resources on PCell and SCell, and to allow their allocations to be signaled on the PDCCH and E-PDCCH.

It is further noted that in these examples, the PCell has a backward compatible primary carrier on which legacy UEs can be served. On the other hand the SCell secondary carrier does not need to have common signals, like Primary Synchronization Sequence (PSS), Secondary Synchronization Sequence (SSS), Physical Broadcast Channel (PBCH), System Information (SI) and not necessarily even Common Reference Signals (CRS) because they are already present in the legacy portion of the carrier, i.e., on the PCell primary carrier. The center frequency offset in this case also indicates the positions of the SCell carrier resources relative to the common channels. Neither, legacy PDCCH needs to be transmitted in the SCell. Due to the fact that the PCell and SCell bandwidths overlap and are synchronous, the synchronization to the SCell can rely on the synchronization channels of the PCell, so that the UE just needs to synchronize with one of them to acquire synchronization to both. Also, the System Information (SI) can be fully presented in the PCell proportion of the carrier, and hence there is no need to duplicate it separately on the SCell. As such, the SCell may act as a pure data boosting carrier, outside of the PCell. Moreover, the SCell nominal bandwidth bw2 may also be selected from the backwards compatible legacy bandwidths. This SCell bandwidth selection would then need no new RF requirements.

Furthermore, if the bandwidth of the SCell is beyond the set of defined bandwidths in 3GPP Release-10, the new bandwidth in terms of PRB(s) needs to be signaled to the 3GPP Release-11 UE. This information can be included to the dedicated RRC signaling for carrier aggregation, when the SCell is configured. Because the SCell is a new type of carrier, it may have radical changes to a legacy carrier, e.g., it may not have common reference signals (CRS) transmitted, but the channel state information (CSI) measurement could be based on channel state information reference signals (CSI-RS) and the demodulation could be based on demodulation reference symbols (DMRS) present in the SCell, e.g., configured specific to the UE. It is also feasible that the SCell is differently configured in the dedicated RRC signaling for different UEs using the resources of the SCell.

Figure 2A:
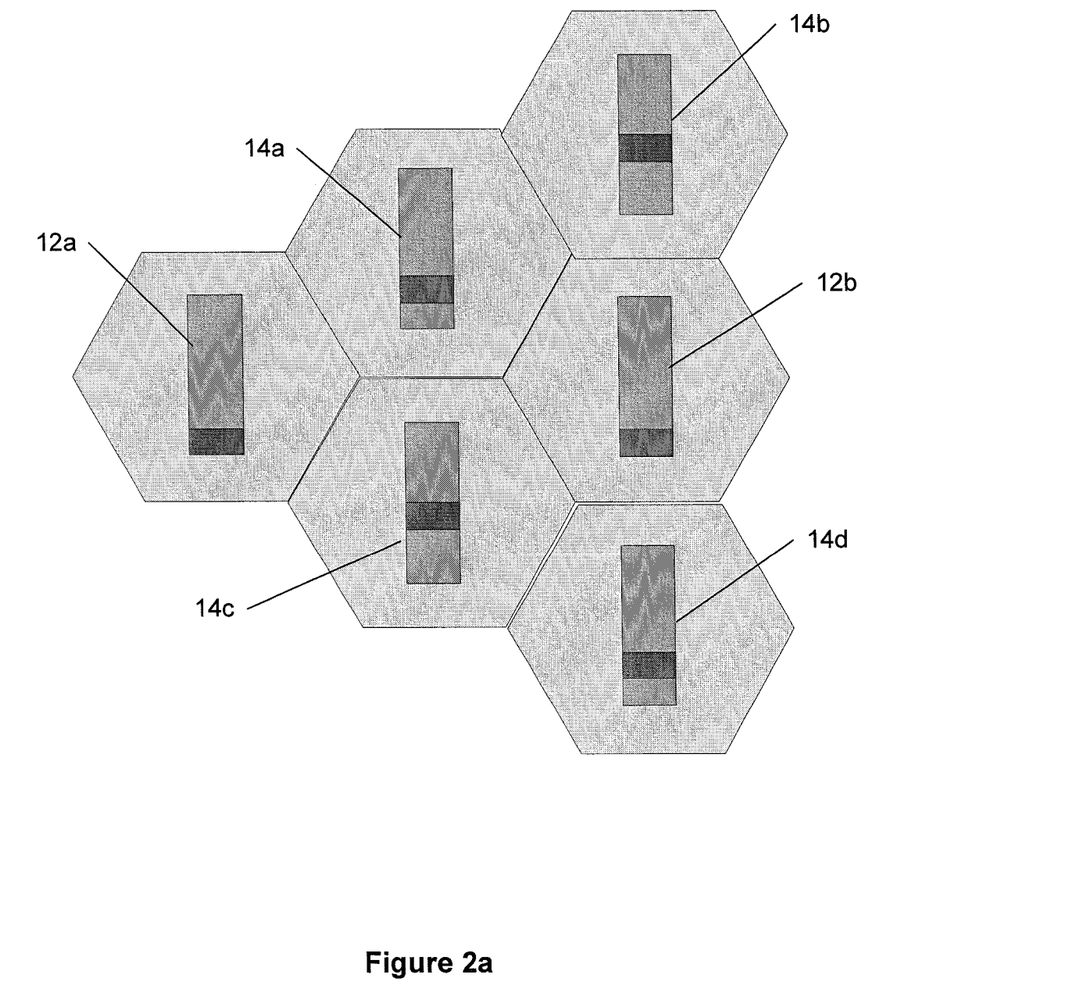
FIGS. 2a and 2b are scenarios demonstrating applications of carrier aggregation in macro cells in homogeneous networks (FIG. 2a) and for a HetNet network, according to exemplary embodiments of the invention (FIG. 2b)
Figure 2B:
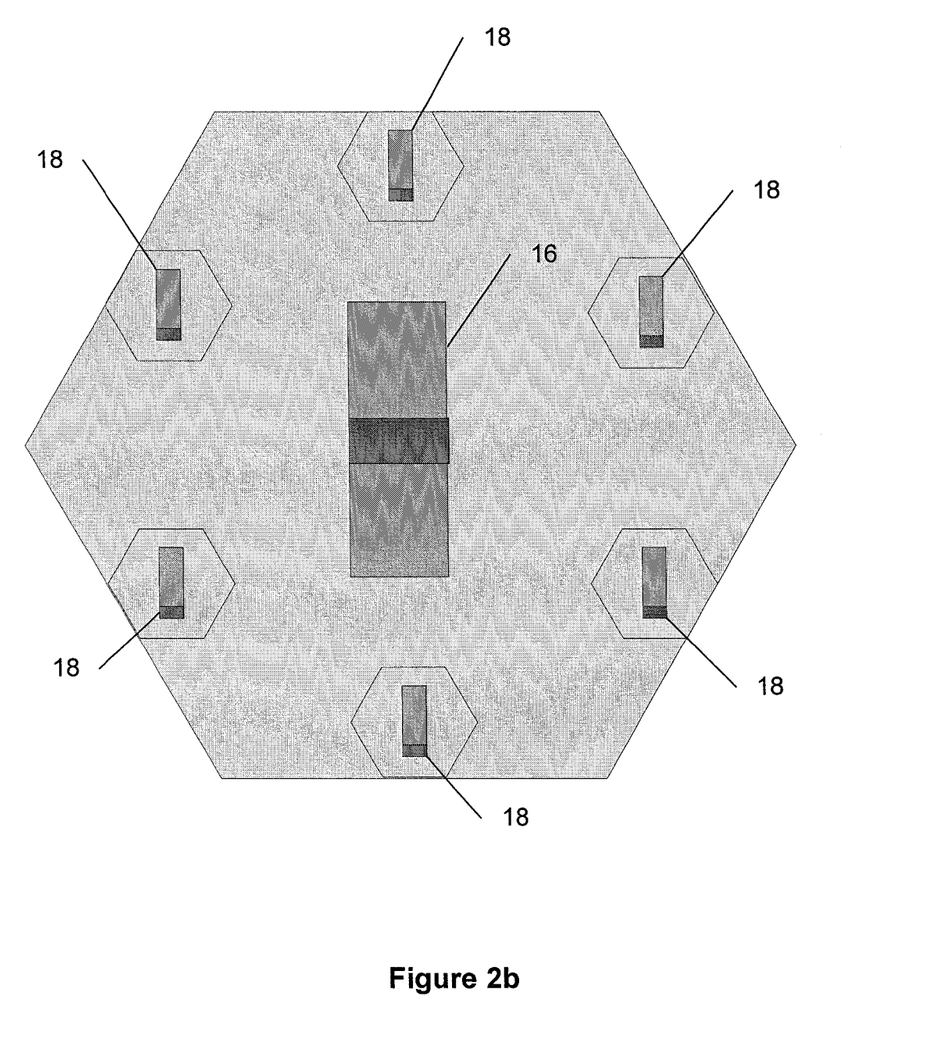

FIGS. 2*a* and 2*b* shows scenarios demonstrating applications of carrier aggregation for macro cells in homogeneous networks as shown in FIG. 2*a* and for a heterogeneous network HetNet as shown in FIG. 2*b*, according to exemplary embodiments of the invention.

FIG. 2*a* demonstrates an example of bandwidth allocations where different macro cells in homogenous network are configured according to scenarios shown in FIGS. 1*b* and 1*c* of carrier allocation for carrier aggregation with indicated primary (bw1) and secondary (bw2) bandwidths in each cell. This allocation for example can be configured based on the Inter-Cell Interference Coordination (ICIC) in a frequency domain (interference management). For example, cells 12*a* and 12*b* in FIG. 2*a* are configured using the edge-aligned frequency allocation illustrated in FIG. 1*b*, and cells 14*a*-14*d* are configured using arbitrary overlapping frequency allocation illustrated in FIG. 1*c*. In this manner, the PCell proportion of the overlapping frequency may have a frequency reuse factor larger than one, which makes the co-channel PCell interferer appear in a distance longer than a neighboring cell. This happens even if the overall bandwidth utilization in this area has the frequency reuse factor of one, i.e., all the cells may use the same overall bandwidth. This provides opportunities to actually control the use of SCell interferers properly, relative to the PCell. Such opportunities for example include decisions on allocations (allocate or not to allocate interfering resources), decisions on which UEs to allocate, how to beamform the allocations and how to power control the allocated interfering resources.

FIG. 2*b* demonstrates an example of bandwidth allocations in HetNet network where a macro cell 16 (e.g., containing macro eNB) and pico cells 18 (e.g., containing pico eNBs or RRHs) are configured according to scenarios shown in FIGS. 1*a*-1*c* for carrier allocation/aggregation with indicated primary (bw1) and secondary (bw2) bandwidths. For example, macro cell 16 in FIG. 2*b* is configured using co-centric frequency allocation illustrated in FIG. 1*a*, and pico cells 18 are configured using edge-aligned frequency allocation illustrated in FIG. 1*b*. This arrangement then provides that the PCell proportion of the macro cells does not create co-channel interference to the PCell proportion of the smaller cell. Instead the PCell interferer is always SCell between the different cell layers (macro and pico). In this example, the PCell interference to PCell may happen between the same cell layers, e.g., among the pico cells. However, the interference distance between the pico PCells is large, because they may not need to form a continuous coverage area, as that is provided by the common macro cell in the area. These embodiments describe a heterogeneous network example, where a network layer consist of large cells like macro cells or micro cells and have in the same geographical area other network layers, hotspots as clusters of cells or independent cells, which consist of small cells like pico cells or femto cells.

According to exemplary embodiments, the following options may be used for configuring the bandwidths (for PCC and SCC) and their center frequencies in the PCell and SCell. First, a single eNB (or RRH) can configure bandwidths and their center frequencies, e.g., as shown in FIGS. 1*a*-1*c*. This single eNB (or RRH) may correspond to any macro/pico cell shown in FIGS. 2*a* and 2*b*. Also a network of eNBs (e.g., eNBs shown in FIG. 2*a*) can configure the bandwidths and center frequencies via the X2 Application Protocol (X2AP) between the eNBs, for example, to effectively coordinate interference (ICIC) for implementing the carrier-based ICIC scheme over the X2 interface.

Furthermore, configuring the bandwidths and center frequencies for the PCell and SCell carriers may be performed using input from other network elements/entities. For instance, Operation and Maintenance (O&M) system or Network Management System (NMS) of an operator can provide input for the PCC and SCC bandwidths and center frequencies for the corresponding eNB(s). Also a SON algorithm, either as a central SON (C-SON) server or as a distributed SON functionality in the eNBs, can optimize the network for proper use of the PCC and SCC bandwidths and center frequencies per cell(s). In other words, SON may tune the parameters for the interference control, and/or for the bandwidth needs in a cell, e.g., dependent on the services and traffic flow types in use by the UE(s) in a cell, or by their QoS requirements and/or expectations like bit rate and delay.

It is further noted that according to embodiments of the invention described above and further below, the eNB (e.g., shown in FIGS. 2a and 2b) can decide the favorite aggregation scheme using allocation scenarios shown in FIGS. 1a-1c for each served UE, may configure the SCell(s), activate/deactivate the SCell(s) and schedule traffic for the PCell and SCells. The eNB can also decide which composition of signaling means it uses on the carrier and which signaling methods it uses for each UE.

It is further noted that embodiments of the invention may be applied to scenarios shown in FIGS. 2a and 2b where PCell and SCell are configured on the same transmission (access) points (e.g., eNB). However, PCell and SCell may be also configured using different transmission points: for example, PCell on macro cell (e.g., using macro eNB) and SCell on pico cell (e.g., using pico eNB). Further, what is said here for the pico nodes and RRH, could apply to micro cells and/or femto cells as well.

The synchronization between PCell and SCell transmissions in case of using different transmission (access) points can be also preserved. For example, assuming that the PCell and SCell configured according to the embodiments of the invention are transmitted from different transmission points, from different remote radio heads or from different sites, the timing of the PCell and SCell transmissions are expected to be arranged sufficiently accurately, say within a fraction of the cyclic extension of the symbols (<1 μs). This is possible for example by having a fiber link between the transmission points, or by having means to compensate the transmission delay between the sites or to synchronize the transmissions from different transmission points to a common, accurate timing reference.

Furthermore, if there is for example a 7 MHz spectrum available, a PCell bandwidth of 5 MHz and a SCell bandwidth of 7 MHz may be configured by the eNB, operator, C-SON, etc. The PCell is a legacy carrier on which the legacy UEs would be served on, and 3GPP Release-11 UEs could be configured to aggregate the SCell to the PCell to increase the data throughput when needed. As for the control channel mechanisms for allocating the data in the SCell, several possible approaches are presented below.

In a first embodiment, backward compatible cross carrier scheduling is considered. According to this embodiment the PDCCH can use cross carrier scheduling technique for allocating the data resources in the SCell to the 3GPP Release-11 compliant UE. Due to the potentially large number of UEs in the PCell, the control channel capacity of the PCell could be a transmission bottleneck, therefore using SCell resources aggregated with the PCell resources as described herein, may relieve the bottleneck.

Figure 3A:
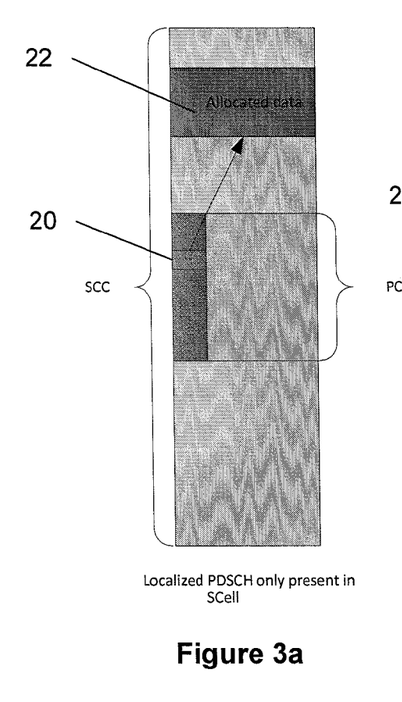
FIGS. 3a-3d are examples of PDCCH-based cross carrier scheduling according to exemplary embodiments of the invention.

FIGS. 3a-3d show examples of PDCCH-based cross carrier scheduling according to exemplary embodiments of the invention. The data resource scheduling on the SCC can be performed, e.g., by the eNB, as described herein. Then as shown in FIG. 3a, the PDCCH 20 in the PCell can signal the information about data resource allocation 22 on the SCC (SCell) bandwidth to a corresponding UE. The allocation information comprises the configured data resource allocation 22 on the SCC (SCell) bandwidth for the 3GPP Release-11 compliant UE to aggregate with the primary carrier. The UE receiving this information on the PDCCH 20 (in the PCell) about the data resource allocation 22 on SCC then synchronizes with the primary or secondary cell (since the PCell and SCell are synchronized, UE synchronization to at least one of them is necessary) and adapts signaling format based on the scheduled data resource of the SCC (for aggregating with the primary legacy carrier). As stated herein, if the primary and secondary cells are synchronized, synchronization to at least one of them is needed.

The allocation information about data resource allocation 22 (also bandwidth bw2 and center frequency offset shown in FIGS. 1a-1c may be signaled on the PDCCH 20 using a downlink control information (DCI) format to a corresponding UE. Other alternatives for signaling the center frequency offset and/or the bandwidth bw2 may include dedicated RRC signaling on the PCell, or the System Information. The DCI describes the PRBs of the allocations and the transport format for example including modulation, coding and spatial structure of the transport block. The DCI is capable of addressing either frequency localized or frequency distributed PRB allocations in a component carrier. A transport block includes the MAC PDUs that contain the "traffic". The DCI describes separately the allocations of the downlink resources and the uplink resources. Hence, there may be a separate PDCCH/E-PDCCH entity per UE for all the UEs allocated in that subframe, and there may be a PDCCH/E-PDCCH entity per each UE for the downlink allocation and separately a PDCCH/E-PDCCH entity per each UE for the uplink allocation. Further, the carrier aggregation activation and deactivation of the SCell is individual per UE.

Figure 3B:
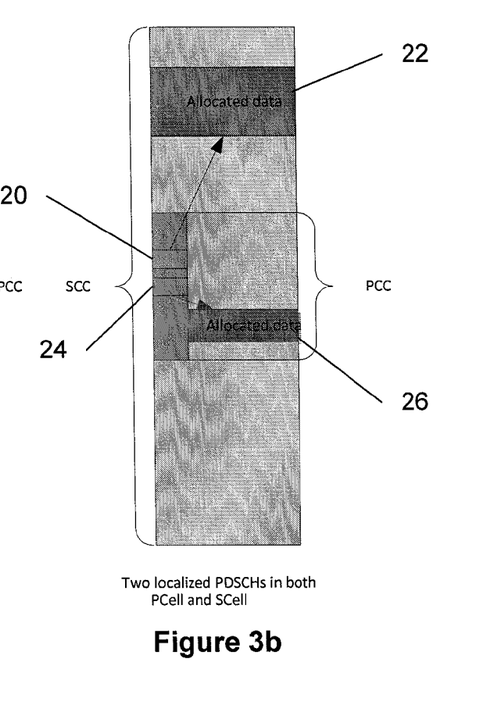

It is also shown in FIG. 3b that the 3GPP Release-11 UE has data resource allocations 26 and 22 allocated in PCell and SCell bandwidths (but indexed as PRBs for SCells), and corresponding data resources scheduling information is provided to the corresponding UE by the two PDCCHs 20 and 24, respectively, located in the PCell bandwidth.

Figure 3C:
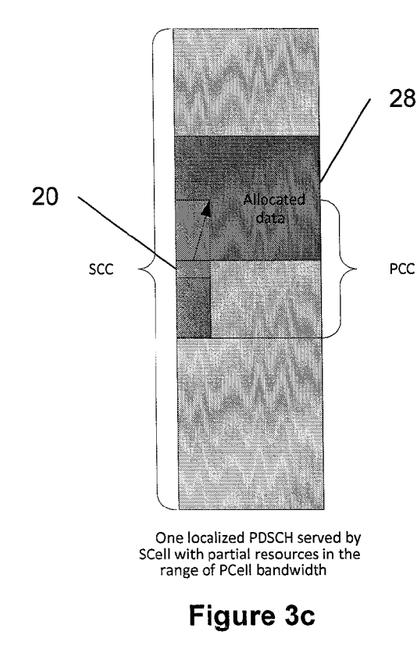

When the allocated data resources 28 span the frequencies across PCell and SCell as shown in FIG. 3c, and have the PRB resource index according to the SCell definition, the PDCCH 20 in the PCell provides the corresponding data resource allocation 28 to the corresponding UE.

Figure 3D:
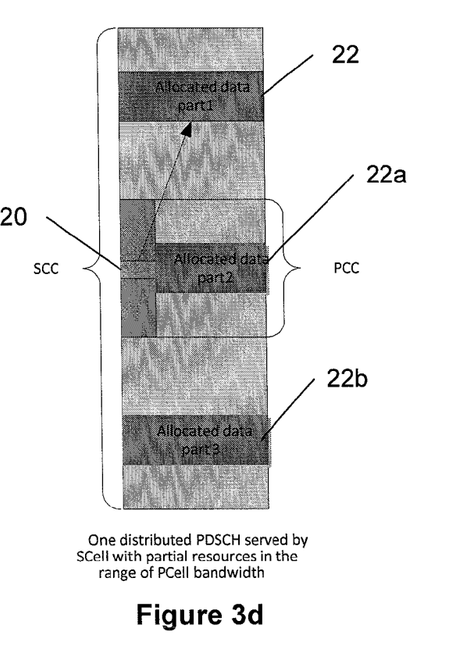
Figure 4A:
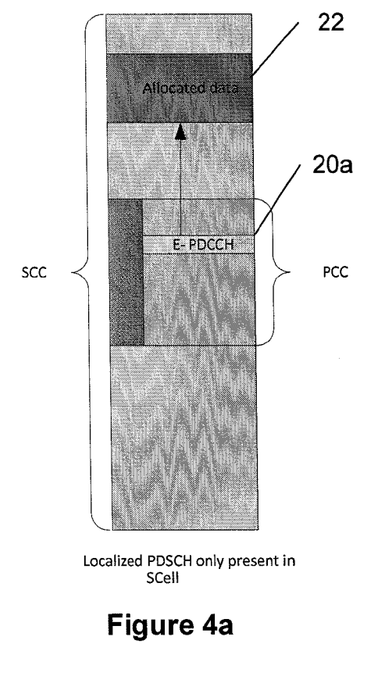
FIGS. 4a-4d are examples of E-PDCCH-based cross carrier scheduling according to exemplary embodiments of the invention.
Figure 4B:
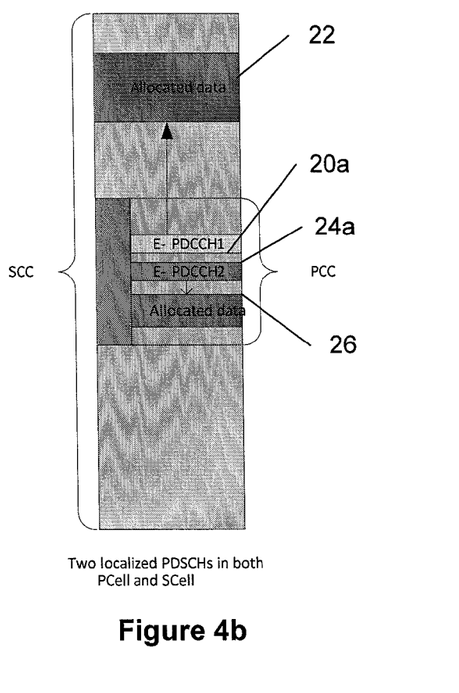
Figure 4C:
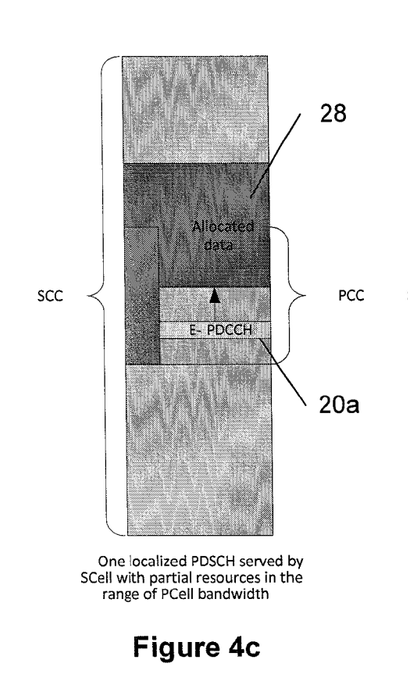
Figure 4D:
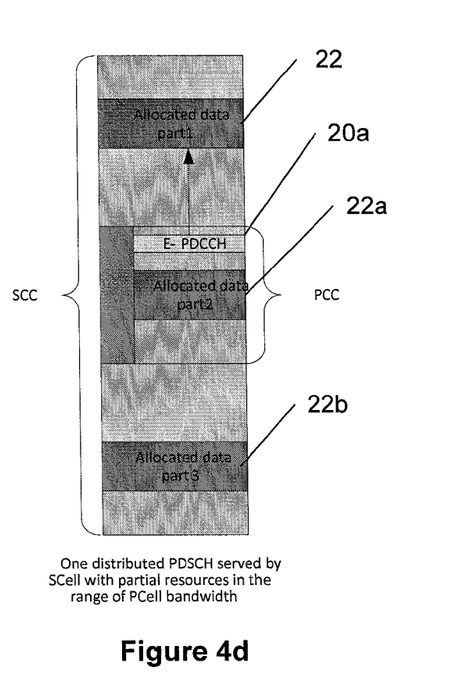
Figure 5A:
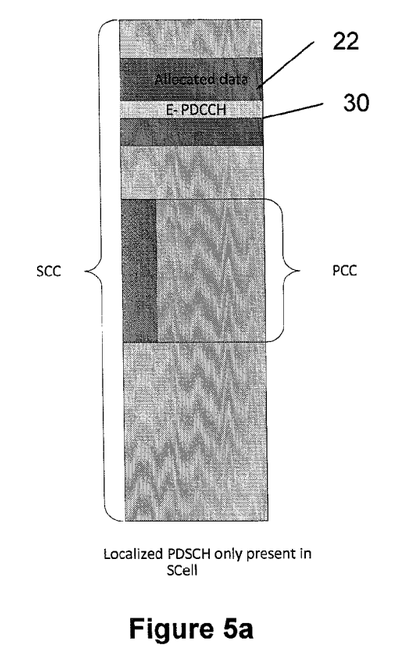
FIGS. 5a-5d are examples of E-PDCCH-based same carrier scheduling according to exemplary embodiments of the invention.
Figure 5B:
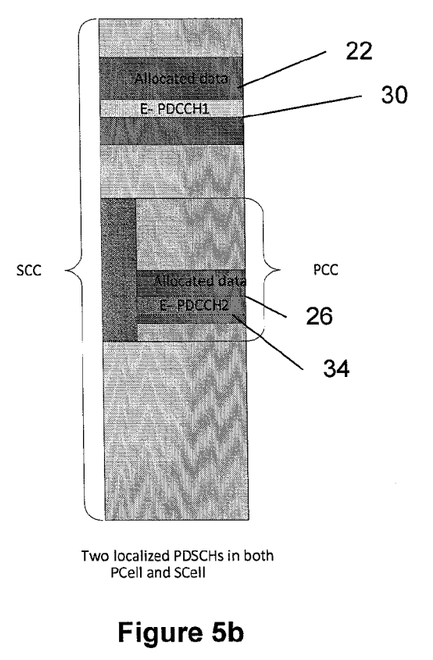
Figure 5C:
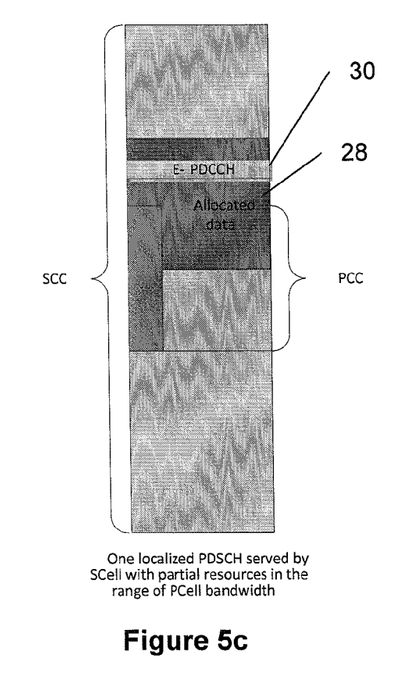
Figure 5D:
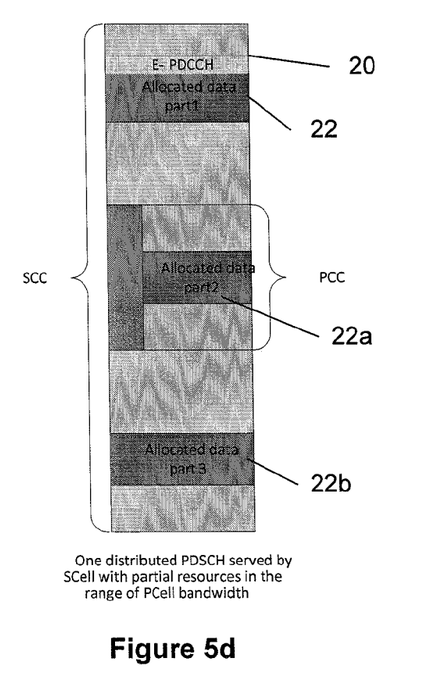

FIG. 3d shows a situation when the distributed data resources 22, 22a and 22b are used across the SCC, and the PDCCH 20 in the PCell provides the corresponding allocations of the scheduled data resources 22, 22a and 22b to the corresponding UE.

It is noted that in scenarios shown in the examples of FIGS. 3a-3d, no E-PDCCH is used to signal scheduled information.

As mentioned above and shown in FIGS. 3a-3d, 4a-4d and 5a-5d, the E-PDCCH data resource allocations in the SCell bandwidth can be scheduled either in a localized or distributed manner, which is further discussed below.

In the current 3GPP Release-10, the resource block allocation information indicates to a scheduled UE a set of contiguously allocated localized resource blocks or distributed resource blocks. A signaling bit indicates for each allocation, whether localized or distributed resource blocks is assigned. Localized allocations for the UE may vary from a single PRB up to a maximum number of PRBs spanning the bandwidth, i.e., bandwidth bw1 of the PCell and bandwidth bw2 of the SCell. Distributed allocations for a UE may vary from a single PRB up to a maximum number of distributed PRBs (N dist_PRB DL) on the carrier.

In other words, outside of the embodiments of the invention, when having separate component carriers for the PCell (bw1) and SCell (bw2−bw1), spanning the allocations (either localized or distributed allocations) over both carriers does not make a continuous set of PRB indexes, as the PRB indexes start separately from 0 at the lowest frequency edge of each of the component carriers.

For example, in 3GPP TS 36.211 V10.3.0 (2011-09), Section 6.2.3 physical resource blocks are numbered from 0 to $N_{RB}^{DL}-1$ in the frequency domain. The relation between the physical resource block number $n_{PRB}$ in the frequency domain and resource elements (k, l) in a slot is given by $$n_{PRB} = \left\lfloor \frac{k}{N_{sc}^{RB}} \right\rfloor.$$

On the other hand according to embodiments described herein, the allocations (either localized or distributed allocations) may cover separately the PCell with the PCell PRB indexing or the Scell with the Scell PRB indexing also including the PCell resources. In the case of PCell, the PRBs can be numbered from 0 to N_PCell_PRB_DL−1, and in the case of Scell, the PRBs can be numbered from 0 to N_Scell_PRB_DL−1, where the set of PCell PRBs is a subset of SCell PRBs separated by the offset proportional to the difference of their carrier center frequencies and their bandwidths. This allows the allocation of any set of localized or distributed allocations by a single allocation entry, whereas in the legacy composition of component carriers without an overlap, i.e., PCell (bw1)+Scell (bw2−bw1), there is a need to have two separate allocation entries whenever the resources extend on both component carriers.

Note that what is said here about the allocations may respectively apply to the uplink resources and allocations, separately from the downlink. The resources and allocations may be Frequency Division Duplexed (FDD) or Time Division Duplexed (TDD) or any combination thereof between the downlink and uplink transmissions. For example, it is feasible to have a downlink new carrier type with a legacy uplink.

In a second embodiment, E-PDCCH based cross carrier scheduling is considered. Due to the potential control channel capacity issue, the 3GPP Release-11 compatible UEs can use E-PDCCH in the PCell bandwidth to allocate the data resources in the SCC (SCell). Therefore, in this option an E-PDCCH based cross carrier scheduling approach is described. However, for the 3GPP Release-11 compliant UEs the E-PDCCH regions may also extend to the SCell. The E-PDCCH regions and the UE-specific search spaces (SS) for the 3GPP Release-11 UEs can be signaled to the UE using dedicated RRC signaling. In this example, the E-PDCCH, for an example UE, includes search space resources of 20a and for another example UE, the E-PDCCH includes search space resources 24a.

Similar to FIGS. 3a-3d, four different cases are illustrated in FIGS. 4a-4d. The difference with FIGS. 3a-3d is that instead of PDCCH regions 20 and 24 in the PCell bandwidth in FIGS. 3a-3d, FIGS. 4a-4d refer to E-PDCCH regions 20a and/or 24a in the PCell bandwidth to signal information (e.g., configured by the eNB) about data resource allocations 22, 22a, 22b, 28 on the SCC (SCell) bandwidth to the corresponding UE(s). In FIGS. 4a-4d (similar to FIGS. 3a-3d and 5a-5d), the E-PDCCH data resource allocations in the SCell bandwidth can be scheduled either in a localized or distributed manner.

It is noted that in scenarios shown in FIGS. 4a-4d, PDCCH capacity problem is further relieved due to the new E-PDCCH. Also the additional bandwidth in the SCell is used for data transmission with less common signaling overhead, therefore higher data throughput is possible.

Moreover, the first and second embodiments described herein may be used separately or in combination for the cross carrier scheduling as described herein.

In a third embodiment, E-PDCCH based same carrier scheduling is considered. In this approach, the 3GPP Release-11 UE is configured to monitor the E-PDCCH search space in the SCell, and the data resource allocation (e.g., configured by the eNB) in the SCell is signaled by the E-PDCCH 30 (see FIGS. 5a-5d) present in the SCell. This approach requires the 3GPP Release-11 UE to be aware of the E-PDCCH regions and SS in the SCell. The information about the E-PDCCH regions (e.g., regions 30, 34 in FIGS. 5a-5d and UE-specific SS in the SCell can be signaled to the 3GPP Release-11 UE, e.g., by the dedicated RRC message either in a UE specific PDCCH in the PCell or by the 3GPP Release-11 compliant E-PDCCH in the PCell, if already configured. The dedicated RRC signaling suits well for signaling the E-PDCCH regions in the SCell as the E-PDCCH regions need not change very often, because the dispersion of the UE-specific search spaces allows the eNB to take the best frequency selective E-PDCCH resource into use at each scheduling interval. In this example, the E-PDCCH, for an example UE, includes search space resources for the region 30 and for another example UE the E-PDCCH includes search space resources for the region 34. Many more search space resources for these UEs will be offered for the selection of the best frequency selective resources into use at each scheduling interval by the eNB. The UE will search through its search space resources at each scheduling interval, in order to find a match of the E-PDCCH signaling in at least one of its search space resources.

As shown in FIGS. 5a-5d, the E-PDCCH in the SCell signals the configured data resources for the E-PDSCH in the SCell. Four different cases illustrated in FIGS. 5a-5d are similar to examples illustrated in FIGS. 3a-3d and 4a-4d. The difference, for example, with FIGS. 4a-4d is that instead of PDCCH regions 20a and 24a in the PCell bandwidth in FIGS. 4a-4d, FIGS. 5a-5d refer to E-PDCCH regions 30 and/or 34 in the SCell to signal information (e.g., configured by the eNB) about data resource allocations 22, 22a, 22b, 28 on the SCC (SCell) bandwidth to the corresponding UE.

It is noted that in scenarios shown in FIGS. 5a-5d, the E-PDCCH is transmitted in the SCC (SCell) bandwidth, so the demand of control channel capacity in the PCell becomes less.

It is further noted that if the data allocation is in the SCell using partial resources in the range of PCell bandwidth, the PRB resource indices follow unambiguously the PRB indexing of the SCell (i.e., double indexing in the overlapped region). When the allocations are fully and clearly either inside the PCell or the SCell, the PCell PRB indexing is used for the PCell and the SCell PRB indexing is used for the SCell respectively.

Figure 6:
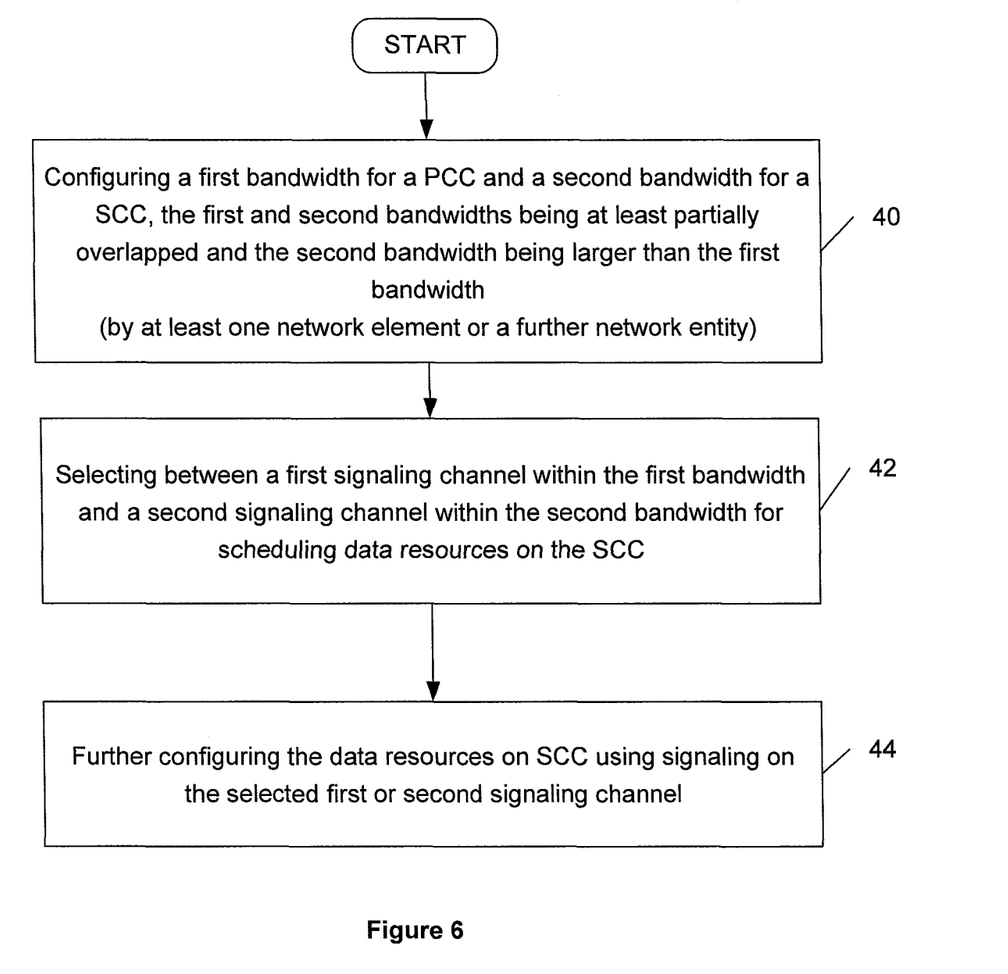
FIG. 6-7 are flow charts demonstrating implementation of exemplary embodiments of the invention.

FIG. 6 shows an exemplary flow chart demonstrating implementation of embodiments of the invention by the network element (e.g., eNB). It is noted that the order of steps shown in FIG. 6 is not absolutely required, so in principle, the various steps may be performed out of the illustrated order. Also certain steps may be skipped, different steps may be added or substituted, or selected steps or groups of steps may be performed in a separate application of various embodiments of the invention.

In a method according to this exemplary embodiment, as shown in FIG. 6, in a first step 40, at least one network element (e.g., eNB) configures a first bandwidth for a PCC (for PCell) and a second bandwidth for a SCC (for SCell), the first and second bandwidths being at least partially overlapped and the second bandwidth being larger than the first bandwidth, as discussed herein in reference to FIGS. 1a-1c and 2a-2b. Moreover, as described above, this step may alternatively be performed by other network elements/entities (e.g., C-SON)

without or together with the eNB. Also a network of eNBs including the at least one network element (e.g., eNBs shown in FIG. 2a) can configure the bandwidths and center frequency between the eNBs, for example, to effectively coordinate interference (ICIC). Therefore, it is seen that these arrangements could be changed at the times of modifying or upgrading the network deployment, or for a given deployment, and are adjusted rarely in time.

In a next step 42, the at least one network element further selects between a first signaling channel within the first bandwidth and a second signaling channel within the second bandwidth for scheduling data resources on the SCC, as discussed herein in reference to FIGS. 3a-3d, 4a-4d and 5a-5d. In a next step 44, the at least one network element further configures the data resources on SCC using signaling on the selected first or second signaling channel.

Figure 7:
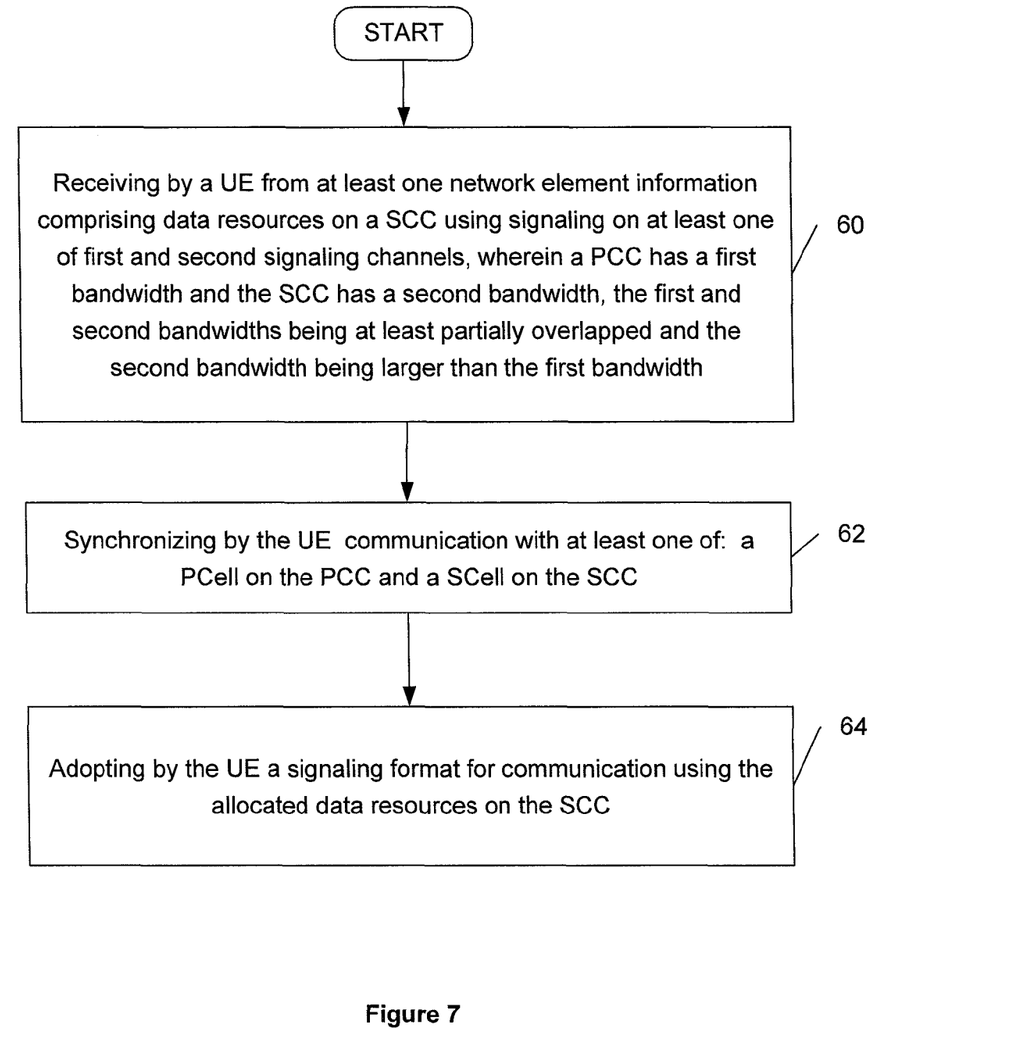

FIG. 7 shows an exemplary flow chart demonstrating implementation of embodiments of the invention by the UE. It is noted that the order of steps shown in FIG. 7 is not absolutely required, so in principle, the various steps may be performed out of the illustrated order. Also certain steps may be skipped, different steps may be added or substituted, or selected steps or groups of steps may be performed in a separate application following the embodiments described herein.

In a method according to this exemplary embodiment, as shown in FIG. 7, in a first step 60, a UE receives from at least one network element information comprising data resources on a SCC using signaling on at least one of first and second signaling channels, wherein a PCC has a first bandwidth and the SCC has a second bandwidth, the first and second bandwidths being at least partially overlapped and the second bandwidth being larger than the first bandwidth, as discussed herein in reference to FIGS. 1a-1c, 3a-3d, 4a-4d and 5a-5d.

In a next step 62, the UE synchronizes with at least one of: a PCell on the PCC and a SCell on the SCC. In a next step 64, the UE adopts different signaling formats for communication using the allocated data resources on the SCC.

The UE may receive and decode signaling formats of PDCCH and/or E-PDCCH. Decoding of PDCCH and E-PDCCH in the same subframe is feasible according to the embodiments included herein. The use of signaling formats and the DCI contained therein is decided by the eNB, and adopted by the UE. The UE searches its defined search spaces for the PDCCH format and separate search spaces for the E-PDCCH format, and whenever the UE finds a search hit of a signaling entity in any one of them, the UE will decode the signaling entities and adopt the DCI contained in them. The signaling entities may appear as many times in the subframe as the eNB has defined. The DCI describes the UE allocation(s), whether they are localized or distributed, whether they are downlink or uplink, whether they are on PCell or SCell resources, whether they are cross-carrier scheduled or on-carrier scheduled as examples according to the embodiments disclosed herein.

The UE hence receives at least one of the signaling formats PDCCH and E-PDCCH, decodes the code block, checks the redundancy checksum and receives the Downlink Control Information (DCI) contained in each one of them. The UE will interpret the signaling information elements of the DCI that indicate at least the allocated physical resources and their Transport Format (modulation, coding, spatial transmission mode). In this manner the UE adopts a signaling format for communication using the data resources. The data resources may appear either on the downlink or on the uplink or both.

Figure 8:
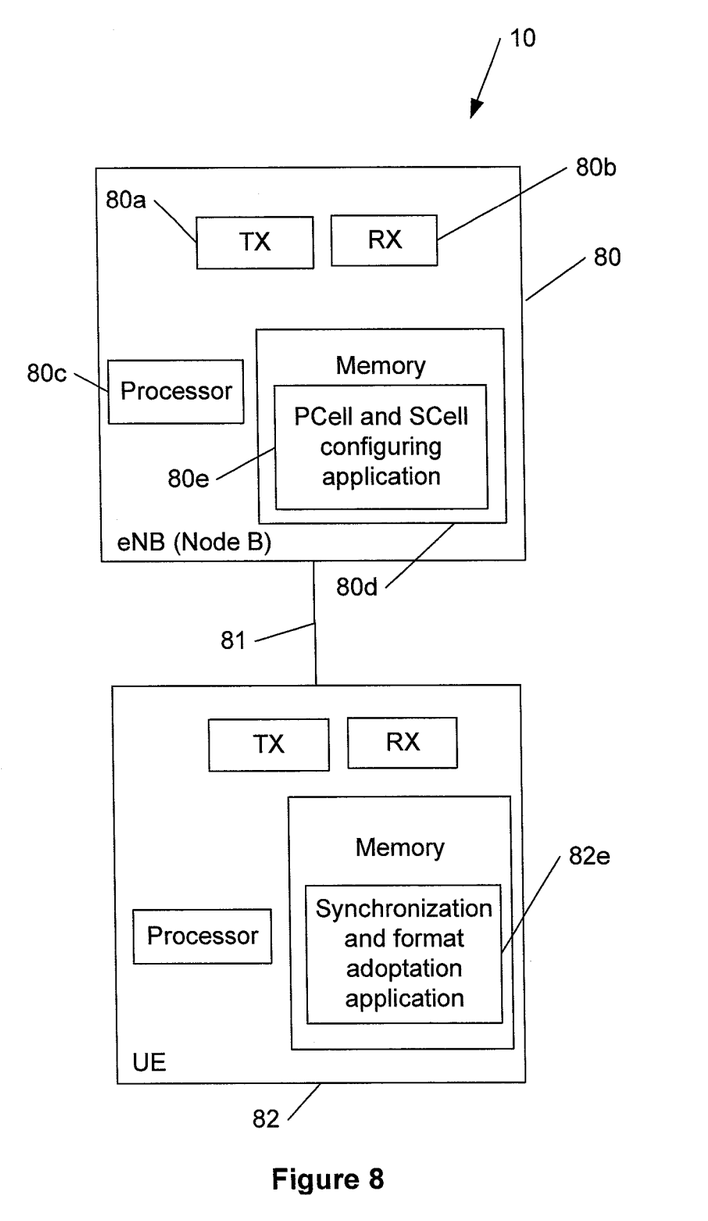
FIG. 8 is a block diagram of wireless devices for practicing exemplary embodiments of the invention.

FIG. 8 shows an example of a block diagram demonstrating LTE devices including eNB 80 (could be, e.g., a macro or pico eNB) comprised in a network 10 and UE 82, according to an embodiment of the invention. FIG. 8 is a simplified block diagram of various electronic devices that are suitable for practicing the exemplary embodiments of this invention, e.g., in reference to FIGS. 1-7, and a specific manner in which components of an electronic device are configured to cause that electronic device to operate. The UE 82 may be implemented as a mobile phone, a wireless communication device, a camera phone, a portable wireless device, a smartphone, a tablet, and the like.

The eNB 80 may comprise, e.g., at least one transmitter 80a, at least one receiver 80b, at least one processor 80c at least one memory 80d and a PCell and SCell configuring application module 80e. The transmitter 80a and the receiver 80b and corresponding antennas (not shown in FIG. 8) may be configured to provide wireless communications with the UE 82 (and other UEs not shown in FIG. 8) using corresponding link 81, according to the embodiments of the invention. The transmitter 80a and the receiver 80b may be generally means for transmitting/receiving and may be implemented as a transceiver, or a structural equivalence thereof. It is further noted that the same requirements and considerations are applied to transmitters and receivers of the device 82.

Various embodiments of the at least one memory 80d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 80c include but are not limited to general purpose computers, special purpose computers, microprocessors, digital signal processors (DSPs) and multi-core processors. Similar embodiments are applicable to memories and processors in the UE 82 shown in FIG. 8.

The a PCell and SCell configuring application module 80e may provide various instructions for performing steps 40-44 shown in FIG. 6. The module 80e may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 80e may be implemented as a separate block or may be combined with any other module/block of the device 80, or it may be split into several blocks according to their functionality.

The UE 82 may have similar components as the network element 80, as shown in FIG. 8, so that the above discussion about components of the eNB 80 is fully applicable to the components of the UE 82.

The synchronization and format adaptation application module 82e in the UE 82 may provide various instructions for performing steps 62-64 shown in FIG. 7. The module 82e may be implemented as an application computer program stored in the memory of the device 82, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 82e may be implemented as a separate block or may be combined with any other module/block of the device 82, or it may be split into several blocks according to their functionality.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method comprising:
   configuring by at least one network element a first bandwidth for a primary component carrier and a second bandwidth for a secondary component carrier, the first and second bandwidths being at least partially overlapped and the second bandwidth being larger than the first bandwidth; and
   selecting between at least one of a first signaling channel within the first bandwidth and a second signaling channel within the second bandwidth for scheduling data resources on the secondary component carrier;
   wherein a first set of physical resource blocks for the primary component carrier is a subset of a second set of physical resource blocks for the secondary component carrier that are separated by an offset proportional to a difference in carrier center frequency, and proportional at least to one of the first bandwidth or the second bandwidth, to permit an allocation of at least one of a set of localized and distributed physical resource blocks by a single allocation entity; and
   wherein indexing is different for physical resource blocks for the primary component carrier and for the secondary component carrier in an overlapping region of the first and second bandwidths.

2. The method of claim 1, wherein communications on the primary component carrier and the secondary component carrier are synchronized.

3. The method of claim 1, wherein the scheduling data resources on the secondary component carrier does not require signaling common information which is used for scheduling data resources on the primary component carrier.

4. The method of claim 3, wherein the common information comprises one or more of: a primary synchronization sequence, a secondary synchronization sequence, a physical broadcast channel, system information and a common reference signal.

5. The method of claim 1, further comprising:
   further configuring the data resources on the secondary component carrier using signaling on the selected first or second signaling channel.

6. The method of claim 1, wherein the first signaling channel is a physical downlink control channel, and the second signaling channel is an enhanced physical downlink control channel.

7. The method of claim 1, wherein the at least one network element is a macro or pico eNB.

8. The method of claim 1, wherein carrier center frequencies of the first and second bandwidths are equal.

9. The method of claim 1, wherein carrier center frequencies of the first and second bandwidths are not equal.

10. The method of claim 1, wherein indexing for physical resource blocks for the primary component carrier and for the secondary component carrier are independent at least in the overlapping region of the first and second bandwidths.

11. The method of claim 1, wherein the allocated data resources for the secondary component carrier are distributed on the second bandwidth including resources on the overlapped first bandwidth.

12. The method of claim 1, wherein the configuring is based on information received from at least one network entity.

13. The method of claim 12, wherein the single allocation entity is a centralized or distributed self optimizing network.

14. The method of claim 12, wherein the configuring the first bandwidth and the second bandwidth is based on coordinating inter-cell interference.

15. A method comprising:
    receiving by a user equipment from at least one network element information comprising data resources on a secondary component carrier using signaling on at least one of first and second signaling channels, wherein a primary component carrier has a first bandwidth and the secondary component carrier has a second bandwidth, the first and second bandwidths being at least partially overlapped and the second bandwidth being larger than the first bandwidth;
    synchronizing communication by the user equipment with one of: a primary cell on the primary component carrier and a secondary cell on the secondary component carrier to use the established synchronization with one of the primary and secondary cells for communicating with both the primary and secondary cells; and
    adopting by the user equipment a signaling format for communication using the data resources on the secondary component carrier;
    wherein a first set of physical resource blocks for the primary component carrier is a subset of a second set of physical resource blocks for the secondary component carrier that are separated by an offset proportional to a difference in carrier center frequency, and proportional at least to one of the first bandwidth or the second bandwidth, to permit an allocation of at least one of a set of localized and distributed physical resource blocks by a single allocation entity; and
    wherein indexing is different for physical resource blocks for the primary component carrier and for the secondary component carrier in an overlapping region of the first and second bandwidths.

16. The method of claim 15, wherein the adopted signaling format is different from a primary signaling format used on the primary component carrier at least in one of their time and frequency and spatial multiplexing structure.

17. The method of claim 15, wherein carrier center frequencies of the first and second bandwidths are not equal.

18. An apparatus comprising:
    at least one processor and a memory storing a set of computer instructions, in which the processor and the memory storing the computer instructions are configured to cause the apparatus to:

configure a first bandwidth for a primary component carrier and a second bandwidth for a secondary component carrier, the first and second bandwidths being at least partially overlapped and the second bandwidth being larger than the first bandwidth; and select between at least one of a first signaling channel within the first bandwidth and a second signaling channel within the second bandwidth for scheduling data resources on the secondary component carrier;

wherein a first set of physical resource blocks for the primary component carrier is a subset of a second set of physical resource blocks for the secondary component carrier that are separated by an offset proportional to a difference in carrier center frequency, and proportional at least to one of the first bandwidth or the second bandwidth, to permit an allocation of at least one of a set of localized and distributed physical resource blocks by a single allocation entity; and wherein indexing is different for physical resource blocks for the primary component carrier and for the secondary component carrier in an overlapping region of the first and second bandwidths.

19. An apparatus comprising:

at least one processor and a memory storing a set of computer instructions, in which the processor and the memory storing the computer instructions are configured to cause the apparatus to:

receive from at least one network element information comprising data resources on a secondary component carrier using signaling on at least one of first and second signaling channels, wherein a primary component carrier has a first bandwidth and the secondary component carrier has a second bandwidth, the first and second bandwidths being at least partially overlapped and the second bandwidth being larger than the first bandwidth;

synchronize communication by a user equipment with one of: a primary cell on the primary component carrier and a secondary cell on the secondary component carrier to use the established synchronization with one of the primary and secondary cells for communicating with both the primary and secondary cells; and adopt by the user equipment a signaling format for communication using the data resources on the secondary component carrier;

wherein a first set of physical resource blocks for the primary component carrier is a subset of a second set of physical resource blocks for the secondary component carrier that are separated by an offset proportional to a difference in carrier center frequency, and proportional at least to one of the first bandwidth or the second bandwidth, to permit an allocation of at least one of a set of localized and distributed physical resource blocks by a single allocation entity; and wherein indexing is different for physical resource blocks for the primary component carrier and for the secondary component carrier in an overlapping region of the first and second bandwidths.

* * * * *